United States Patent Office 2,983,777
Patented May 9, 1961

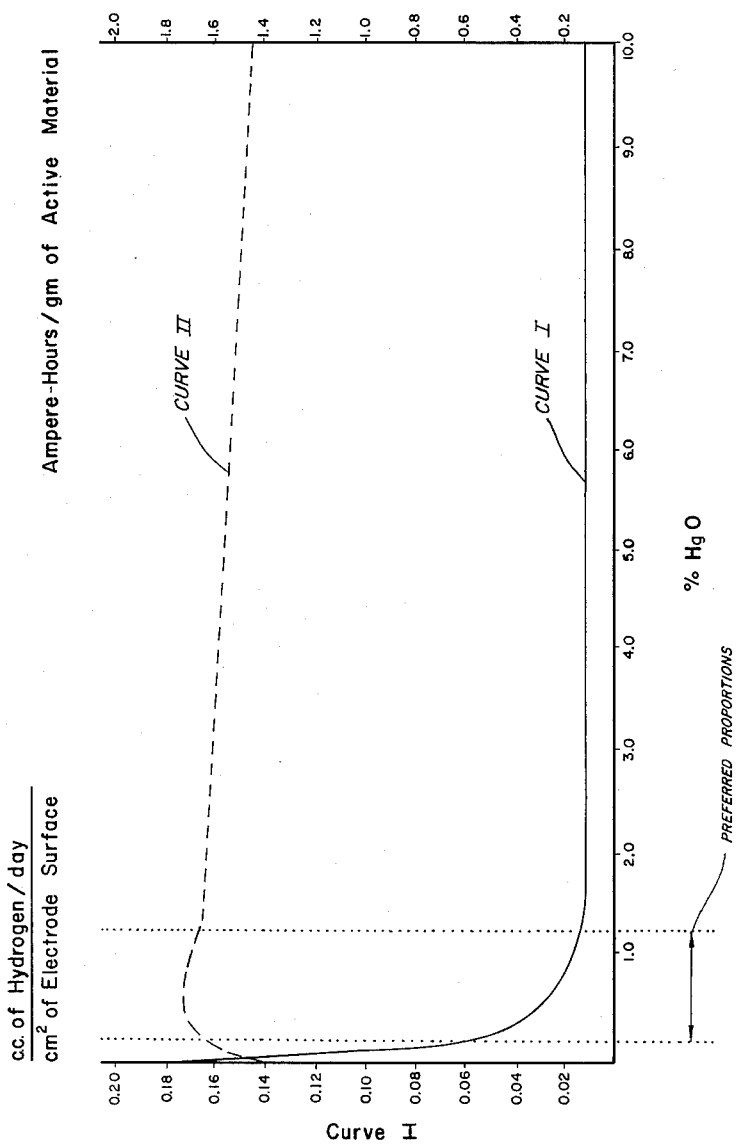

2,983,777
RECHARGEABLE BATTERY

Michel N. Yardney, New York, N.Y., assignor to Yardney International Corp., New York, N.Y., a corporation of New York Filed July 23, 1956, Ser. No. 599,414

2 Claims. (Cl. 136—20)

This invention relates to electric batteries with one or more negative electrodes made from a zinc-containing comminuted active material, e.g. as disclosed in U.S. Patent No. 2,594,710, issued April 29, 1952, to H. André. The present application is a continuation-in-part of application Serial No. 288,556, filed May 17, 1952, now abandoned, as a continuation-in-part of application No. 153,-830 which was filed on April 4, 1950, and is now U. S. Patent No. 2,610,219.

Electric batteries, of both the accumulator type and the primary type, constructed with silver positive electrodes and zinc negative electrodes have recently proved their superiority to the previously used types because of their inherent characteristics of high capacity per unit weight and unit volume. With the rise of industrial importance of cells of the type described, many stringent conditions for operation of these cells have been imposed, including the ability to function at all climatic conditions on the surface of the earth as well as at high altitudes (aircraft, missile and satellite uses). Moreover, since the cells are often used as emergency energy sources, they must be capable of retaining their electrical energy potential and capacity over long periods at various conditions of storage.

It is an object of the present invention to improve the operating characteristics of cells of the aforementioned type by modifying the zinc electrodes therein contained.

Another object is to reduce the inner electrode resistance of the negative electrode.

A further object of this invention is to increase the capacity of zinc-silver cells subject to repeated heavy discharge.

Other objects include the reduction in the amount of hydrogen evolved at the negative electrode during high-temperature storage and to increase the dimensional stability of both single cells and composite units of such cells.

As already disclosed in my aforementioned earlier applications, the admixture of mercuric oxide (especially that of the yellow, granular type) with the zinc oxide of the negative electrode is beneficial in amounts of up to about 10% by weight, a particularly favorable concentration having been encountered in the neighborhood of 4½%. Further tests have established, however, the existence of a second optimum in the range below 1%, it having been found by these tests that satisfactory reduction of hydrogen evolution will occur with proportions as low as 0.5% or, for some applications at least, even 0.2% while the storage capacity of the electrode, and thereby that of the cell containing same, will be materially increased if the quantity of mercuric oxide is held to not more than about 1.2% of the amount of zinc oxide.

On prolonged storage, a negative electrode containing zinc tends to liberate hydrogen from an alkaline electrolyte such as potassium hydroxide in accordance with the reaction $$Zn + KOH \rightarrow K_2ZnO + H_2$$

The addition of mercury in the form of its oxide, as taught in my earlier applications, results in a definite amalgamation of the zinc which reduces gassing by inhibiting the above reaction. This advantage, however, is obtained at the expense of a partial passivation of the active material of the negative electrode, whereby at concentrations greater than about 10% a net loss in capacity can be observed instead of the gain expected on account of the insolubilization of the zinc. Maximum gain in storage capacity is obtained, in accordance with the present invention, in the aforementioned region between 0.2% and 1.2% where, it may be assumed, an alloy of zinc and zinc amalgam is formed instead of the simple amalgam.

Reference is made to the sole figure of the accompanying drawing which is a graph showing hydrogen evolution and storage capacity plotted against percentage of mercuric oxide. Curve I indicates hydrogen evolution in terms of cubic centimeter per day of storage per square centimeter of surface area of the negative electrode or electrodes. Curve II indicates storage capacity in ampere-hours per gram of negative active material averaged over ten charge-discharge cycles. The mercuric-oxide/zinc-oxide ratio marked off along the abscissa is to be understood as relating to the condition of the virgin electrode whose active material consists essentially of a mixture of the two oxides. Such electrode can be produced in the best manner by mixing the prescribed amounts of zinc oxide and mercuric oxide together until a substantially homogeneous powder is formed, pasting or packing this powder on a suitable supporting grid, in a manner well known per se, and wrapping the electrode body thus formed in an envelope of permeable or semi-permeable separator material.

Since the zinc as well as the mercury are originally both in their oxidized state, no reaction occurs between them until the zinc oxide of the electrode has been reduced by the charging of the cell. Thus, prolonged storage of the electrode in either the dry or the wet state will not lead to chemical changes in the active material. In contradistinction hereto, a dry-stored electrode composed of a mixture of mercuric oxide and metallic zinc will often undergo local reactions, owing to some unavoidably present moisture, resulting in an uneven distribution of the mercury throughout the body of active material. This possibility of uneven distribution also exists if the electrode is wet-stored and the mercury is allowed to plate out on the zinc without the flow of a substantial external current.

By the method herein disclosed, in which the alloying of the zinc with the mercury takes place on charging, essential uniformity is insured by the fact that the reduction of the two metals is determined by the rate of penetration of the electrode by the charging current. It will be understood that this result may also be accomplished, if desired, by reducing the zinc-oxide/mercuric-oxide mixture in a dummy cell and forming the electrode body from the mass thus obtained; the electrode so produced is in a precharged state, capable of being instantly discharged against a suitable positive electrode, e.g. of silver peroxide. A satisfactory charging rate, in either a dummy cell or an actual battery, is 0.05 amps./gram. Within the range of proportions indicated above, as shown in the drawing, the capacity of the electrode lies considerably above the value applying to a mercury-free electrode; in the adjoining region from 1.2% to 10%, the capacity is still somewhat above that value but to a markedly lesser extent, the accompanying further reduction in hydrogen evolution being so slight as generally not to warrant the increase in mercury concentration.

It should be noted that the graphs do not reflect an optimum in the neighborhood of 4.5%, in accordance with my earlier disclosures, inasmuch as that optimum manifests itself mainly during the first few discharges and not on a ten-cycle average.

I claim:
1. In an alkaline cell, in combination, an alkaline electrolyte, a positive electrode in contact with said electrolyte containing silver as an active material and an uncharged negative electrode in contact with said electrolyte containing as an active material a mixture of zinc oxide and mercuric oxide, said mercuric oxide being present in a proportion ranging between 0.2% and 1.2%, by weight, of said zinc oxide.

2. In an alkaline cell, in combination, an alkaline electrolyte, a positive electrode in contact with said electrolyte containing silver as an active material and an uncharged negative electrode in contact with said electrolyte containing as an active material a mixture of zinc oxide and mercuric oxide, said mercuric oxide being present in a proportion of approximately 0.5% of said zinc oxide.

References Cited in the file of this patent

UNITED STATES PATENTS

| | | |
|---|---|---|
| 307,945 | Hogg | Nov. 11, 1884 |
| 359,877 | Meserole | Mar. 22, 1887 |
| 976,092 | Morrison | Nov. 15, 1910 |
| 1,028,354 | Heil | June 4, 1912 |
| 1,139,213 | Morrison | May 11, 1915 |
| 2,018,942 | Brownsdon | Oct. 29, 1935 |
| 2,526,692 | Ruben | Oct. 24, 1950 |
| 2,542,710 | Ruben | Feb. 20, 1951 |
| 2,594,709 | Andre | Apr. 29, 1952 |